US008712202B2

(12) United States Patent
Sanders et al.

(10) Patent No.: US 8,712,202 B2

(45) Date of Patent: Apr. 29, 2014

(54) SINGLE MODE OPTICAL FIBER WITH IMPROVED BEND PERFORMANCE

(75) Inventors: Paul E. Sanders, Madison, CT (US); Edward M. Dowd, Madison, CT (US); Brian J. Pike, Wallingford, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 12 days.

(21) Appl. No.: 12/892,752

(22) Filed: Sep. 28, 2010

(65) Prior Publication Data

US 2011/0091175 A1 Apr. 21, 2011

Related U.S. Application Data

(63) Continuation of application No. 11/744,327, filed on May 4, 2007, now Pat. No. 7,805,039.

(51) Int. Cl.
*G02B 6/04* (2006.01)

(52) U.S. Cl.
USPC .......... 385/123; 65/397

(58) Field of Classification Search
USPC .......... 385/123; 65/397
See application file for complete search history.

(56) References Cited

U.S. PATENT DOCUMENTS

| | | | | |
|---|---|---|---|---|
| 4,217,027 | A | | 8/1980 | Macchesney et al. |
| 4,336,049 | A | | 6/1982 | Takahashi et al. |
| 4,378,987 | A | | 4/1983 | Miller et al. |
| 4,395,270 | A | | 7/1983 | Blankenship et al. |
| 4,494,968 | A | | 1/1985 | Bhagavatula et al. |
| 4,610,709 | A | | 9/1986 | Kawauchi et al. |
| 4,675,038 | A | | 6/1987 | Ainslie et al. |
| 4,804,247 | A | | 2/1989 | Kyoto et al. |
| 4,810,276 | A | | 3/1989 | Gilliland |
| 4,822,399 | A | | 4/1989 | Kanamori et al. |
| 4,968,339 | A | | 11/1990 | Miller et al. |
| 4,969,941 | A | | 11/1990 | Kyoto et al. |
| 5,044,724 | A | * | 9/1991 | Glodis et al. .......... 385/127 |

(Continued)

FOREIGN PATENT DOCUMENTS

| | | | |
|---|---|---|---|
| CN | 101414028 | A | 4/2009 |
| EP | 0283748 | A1 | 9/1988 |

(Continued)

OTHER PUBLICATIONS

GB Search Report for Appplication No. GB0808040.0, Dated Sep. 3, 2008.

(Continued)

*Primary Examiner* — Charlie Peng
*Assistant Examiner* — Peter Radkowski
(74) *Attorney, Agent, or Firm* — Patterson & Sheridan, LLP

(57) ABSTRACT

Methods and apparatus relate to optical fibers suitable for use in sensing applications exposed to radiation environments. The fibers include a core of pure silica or chlorine doped silica surrounded by a fluorinated silica cladding. These glasses for the core and cladding utilize dopants that resist radiation-induced attenuation. A two step process for forming the cladding can achieve necessary concentrations of the fluorine by performing a soot deposition process in a different environment from a consolidation process where the soot is sintered into a glass. Concentration of fluorine doped into the cladding layer enables obtaining a numerical aperture that confines a mono-mode of the fiber to resist bend-induced attenuation. Dimensions of the fiber further facilitate bending ability of the fiber.

16 Claims, 3 Drawing Sheets

(56) References Cited

U.S. PATENT DOCUMENTS 5,055,121 A 10/1991 Kanamori et al.
5,076,824 A 12/1991 Miller
5,090,979 A 2/1992 Le Sergent et al.
5,163,987 A 11/1992 Ishiguro et al.
5,732,178 A 3/1998 Terasawa et al.
5,995,695 A 11/1999 Aikawa et al.
6,131,415 A 10/2000 Chang et al.
6,266,467 B1 7/2001 Kato et al.
6,333,283 B1 12/2001 Urano et al.
6,343,175 B1 1/2002 Sasaoka
6,449,415 B1 9/2002 Sasaoka
6,574,408 B2 6/2003 Lemaire et al.
6,681,072 B2 1/2004 Nagayama et al.
6,783,898 B2 8/2004 Berkey et al.
6,862,900 B2 * 3/2005 de Sandro et al. .............. 65/397
6,928,211 B2 * 8/2005 Tanigawa et al. ............... 385/24
6,947,650 B1 * 9/2005 Homa ........................... 385/123
6,987,918 B1 1/2006 Bickham
7,076,139 B1 7/2006 Aikawa et al.
7,088,900 B1 8/2006 Mishra
7,089,765 B2 8/2006 Schaper et al.
7,103,251 B2 9/2006 Bickham et al.
7,203,407 B2 4/2007 Berkey et al.
7,280,728 B2 10/2007 Berkey et al.
7,313,312 B2 12/2007 Kimball et al.
7,336,877 B2 2/2008 Bickham
7,382,957 B2 6/2008 Chen et al.
7,805,039 B2 9/2010 Sanders et al.
2001/0017967 A1 * 8/2001 Hirano et al. ................. 385/123
2001/0031119 A1 10/2001 Kato et al.
2002/0012511 A1 1/2002 Kato et al.
2002/0073740 A1 6/2002 Dawes et al.
2002/0097970 A1 * 7/2002 Sasaoka ........................ 385/123
2002/0136515 A1 9/2002 Schaper et al.
2003/0063878 A1 * 4/2003 Matsuo et al. ................ 385/123
2003/0161598 A1 * 8/2003 Ellison et al. ................. 385/123
2004/0042759 A1 3/2004 Park et al.
2005/0063663 A1 3/2005 Anderson et al.
2005/0244119 A1 11/2005 Sasaki et al.
2005/0257571 A1 11/2005 Koaizawa et al.
2005/0271347 A1 12/2005 Kimball et al.
2005/0286849 A1 12/2005 Bickham
2006/0088261 A1 4/2006 Berkey et al.
2006/0088262 A1 4/2006 Berkey et al.
2007/0177846 A1 8/2007 Chen et al.
2007/0266738 A1 11/2007 Gallagher et al.
2007/0274666 A1 11/2007 Aikawa et al.
2008/0050086 A1 2/2008 Bickham et al.
2008/0080823 A1 4/2008 Gray et al.
2008/0107386 A1 5/2008 Kudou et al.
2008/0124028 A1 5/2008 Bickham et al.
2008/0131066 A1 6/2008 Bickham et al.

FOREIGN PATENT DOCUMENTS

EP 283748 A1 * 9/1988 ............... G02B 6/22
EP 0582894 A1 2/1994
EP 582894 A1 * 2/1994 ............. G02B 6/255
EP 1191367 A2 * 3/2002 ............... G02B 6/16
EP 1191367 A3 1/2004
EP 1547981 6/2005
JP 04317438 A * 11/1992 .............. C03C 13/04
JP 2004338958 12/2004

OTHER PUBLICATIONS

Canadian Office Action for Application No. 2630557, Dated Nov. 22, 2010.

Canadian Office Action dated Oct. 4, 2011 for Canadian Patent Application No. 2,630,557, 3 pages.

Combined Search and Examination Report dated Jul. 18, 2012 issued by the Intellectual Property Office of Great Britain in corresponding Application No. GB 1210473.3.

Examination Report dated Jan. 9, 2013, issued by the UK Intellectual Property Office in Application No. GB1210473.3.

* cited by examiner

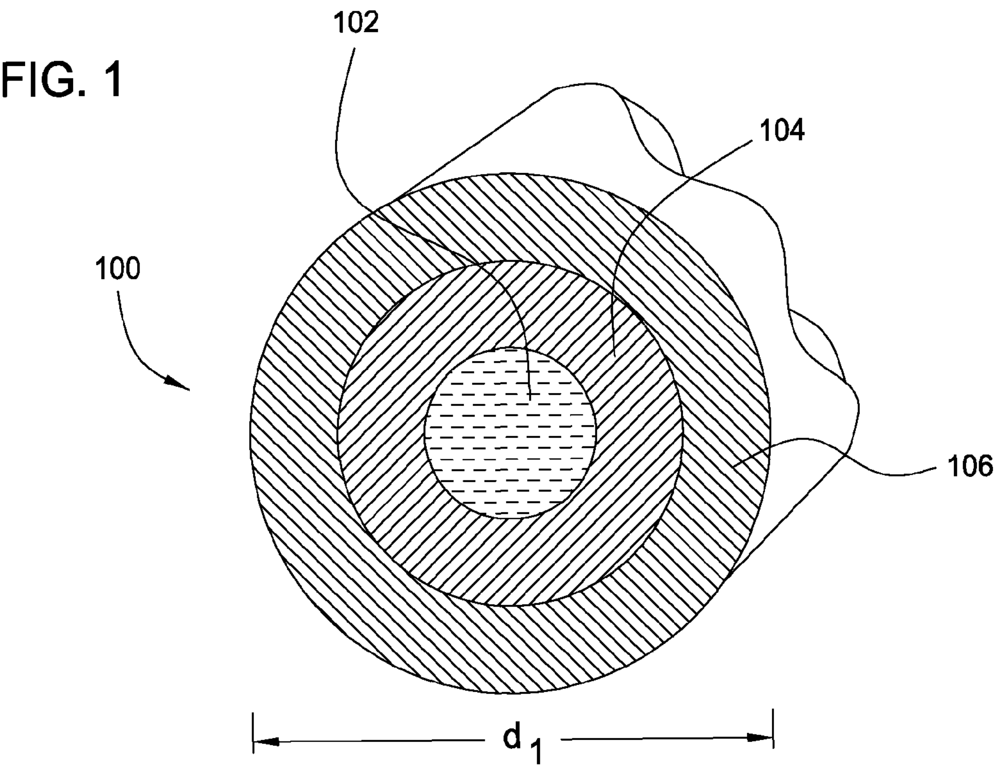
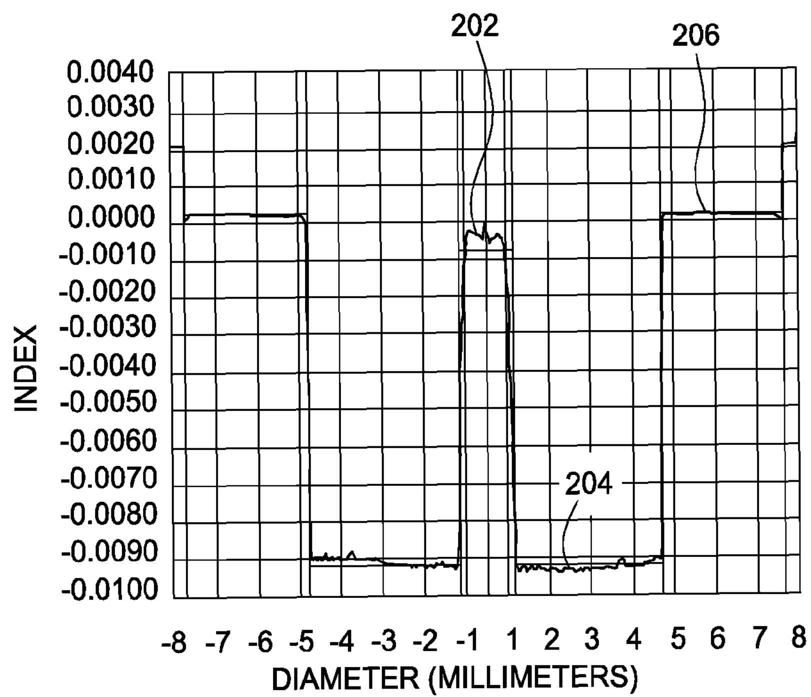
FIG. 2

SINGLE MODE OPTICAL FIBER WITH IMPROVED BEND PERFORMANCE

CROSS-REFERENCE TO RELATED APPLICATIONS

This application is a continuation of U.S. patent application Ser. No. 11/744,327, filed May 4, 2007 now U.S. Pat. No. 7,805,039, which is herein incorporated by reference in its entirety.

GOVERNMENT RIGHTS IN THIS INVENTION

This invention was made with U.S. government support via the Navy under contract number N00173-04C-6024. The U.S. government has certain rights in this invention.

BACKGROUND OF THE INVENTION

1. Field of the Invention

Embodiments of the invention generally relate to optical fibers that are suitable for use in sensing applications exposed to radiation environments.

2. Description of the Related Art

Interferometer and grating based optical sensors rely on light transmission through single mode optical fibers. A fiber optic gyroscope (FOG) exemplifies one type of sensor in which light is guided through a sensing coil of fiber and then detected to determine angular rotation of the FOG based on modulation of the light detected. However, packaging and deployment of optical sensors frequently subjects the fiber to bending that can detrimentally affect both optical and mechanical properties of the fiber. Furthermore, the fibers may include glass index-modifying dopants such as germanium and phosphorus that sensitize the glass leading to high attenuation or even total darkening when operating in harsh environments that expose the fiber to nuclear radiation and hydrogen. Sensing applications in such harsh environments utilizing any prior available fiber suffer from one or both of these problems associated with the fiber.

Therefore there exists a need for optical fibers with improved performance characteristics, such as resistance to bend-induced attenuation and radiation-induced attenuation, and methods of manufacturing these optical fibers.

SUMMARY OF THE INVENTION

According to some embodiments, an optical waveguide includes a core formed of one of silica without dopants and silica doped with chlorine, and a cladding surrounding the core and formed of silica doped with fluorine such that one or more of fluorine and chlorine are the only dopants present in the core and the cladding, wherein the cladding has a first refractive index depressed at least 0.008 relative to a second refractive index of the core.

For some embodiments, a method of forming an optical waveguide includes depositing at a first temperature a silica soot layer inside a substrate tube using a gas flow of a silicon containing halide and oxygen, consolidating the soot layer at a second temperature higher than the first temperature, wherein the consolidating occurs in an environment of a substantially pure fluorine precursor gas to produce a fluorine doped cladding glass, and depositing a silica layer onto the cladding glass to provide a core glass.

In some embodiments, an optical waveguide includes a core formed by glass made of one of pure silica and silica doped only with chlorine, an inner cladding layer surrounding the core and formed by glass made of silica doped only with fluorine, wherein the inner cladding layer has a first refractive index depressed at least 0.008 relative to a second refractive index of the core, and an outer cladding layer formed by glass made of one of pure silica and silica doped only with fluorine, wherein dimensions of the core and the cladding layers define a mode field diameter for single mode propagation through the waveguide that has an outermost glass diameter of 78 to 82 microns.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a cross section of an optical fiber in accordance with embodiments of the invention.

FIG. 2 is a refractive index profile across a preform for the optical fiber shown in FIG. 1.

DETAILED DESCRIPTION

Figure 3:
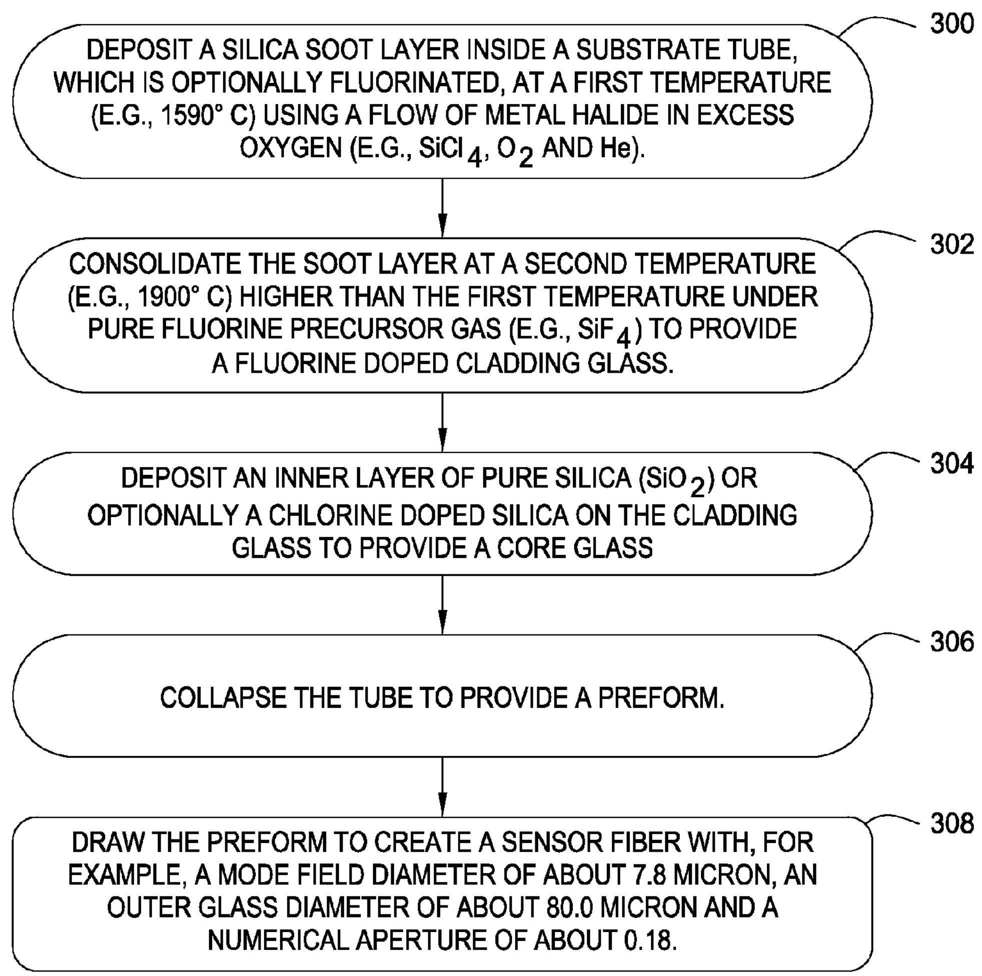
FIG. 3 is a flow chart illustrating a method of manufacturing optical fiber in accordance with embodiments of the invention.

Embodiments of the invention relate to optical fibers suitable for use in sensing applications exposed to radiation environments. The fibers include a core of pure silica or chlorine doped silica surrounded by a fluorinated silica cladding. These glasses for the core and cladding utilize dopants that resist radiation-induced attenuation. A two step process for forming the cladding can achieve necessary concentrations of the fluorine by performing a soot deposition process in a different environment from a consolidation process where the soot is sintered into a glass. Concentration of fluorine doped into the cladding layer enables obtaining a numerical aperture that confines a mono-mode of the fiber to resist bend-induced attenuation. Dimensions of the fiber further facilitate bending ability of the fiber.

FIG. 1 shows a cross section of an optical fiber 100 with a core 102 for guiding light propagating through the fiber 100, a cladding layer 104 surrounding the core 102, and an outer substrate layer 106. An outer diameter ($d_1$) of the outer substrate layer 106 may be less than 120 microns, less than 100 microns, or about 78 to about 82 microns. The outer substrate layer 106 defines outermost glass of the fiber 100 and may be in direct contact with a coating (not shown) such as a polymer. Relative to telecommunication fibers that typically have an outer glass diameter of 125 microns, the fiber 100 enables bending around diameters that are smaller since stress in the fiber 100 from tension/compression caused by the bending increases with larger diameters.

To further improve bending ability of the fiber 100, dimensions and optical characteristics of the core 102 and the cladding layer 104 may make the fiber 100 single mode with the mode confined to resist bend-induced attenuation. For example, a mode field diameter of the fiber 100 may be about 7.8 microns at an operating wavelength nominally at 1550 nm. A refractive index difference, in some embodiments, of at least 0.008 or at least 0.009 between the core 102 and the cladding layer 104 creates a numerical aperture of about 0.18 that facilitates in confining the mode propagating along the fiber 100. As a comparison, conventional telecommunication fibers have a larger mode field diameter of 11.5 microns and a lower numerical aperture of 0.11.

The fiber 100 lacks constituents such as germanium and phosphorus in the core 102 and the cladding layer 104 that can lead to several light absorbing defects when exposed to radiation and hydrogen. For some embodiments, pure silica ($SiO_2$) or chlorine doped silica forms the core 102. Fluorine (F) doped silica makes up the cladding layer 104 to lower the refractive index of the cladding layer 104 relative to the refractive index of pure silica or chlorine doped silica of the core 102. This amount of refractive index depression corresponds to quantity of fluorine dopant incorporated into the cladding layer 104. Embodiments of the invention thus improve fluorine incorporation levels in the cladding layer 104 to achieve the aforementioned mode parameters and numerical apertures that aid in confining the mode.

FIG. 2 illustrates a refractive index profile across a preform (Example 1) from which the optical fiber 100 is drawn. A central peak 202 corresponds to what becomes the core 102 and represents the refractive index of pure silica at about −0.0005. A trough 204 bounds the central peak 202. The trough 204 at about −0.009 characterizes the refractive index of fluorine doped silica that develops into the cladding layer 104. An edge plateau 206 represents the refractive index at around 0.0 of a substrate tube made of pure silica that forms the substrate layer 106 of the fiber 100.

FIG. 3 shows a flow chart illustrating a method of manufacturing the optical fiber 100 by an improved modified chemical vapor deposition (MCVD) technique. It will be appreciated that conventional MCVD as discussed herein is exemplified in U.S. Pat. No. 4,217,027 to MacChesney, et al, the disclosure of which is incorporated herein in its entirety. As will be discussed herein below in more detail, conventional MCVD is insufficient to produce the embodiments of the invention. At soot deposition step 300, gasses including a metal-halide in excess oxygen ($O_2$) and other atmospheric gases such as helium (He) mix inside a rotating substrate tube, which is formed of silica that is optionally fluorinated. During the soot deposition step 300, heating the substrate tube at a first temperature causes a silica soot to form on the inside surface of the substrate tube due to reaction of the gasses. A heat zone or burner traversing the substrate tube maintains the first temperature sufficient to allow oxidation of the metal-halide but below a threshold heat required for fusing or sintering of the silica soot.

Next, a consolidation step 302 separate and independent of the soot deposition step 300 fuses the silica soot layer into glass under pure fluorine precursor gas. The consolidation step 302 occurs in the presence of the fluorine precursor gas and at a second temperature, which is higher than the first temperature and sufficient to consolidate the silica soot. Unlike single step MCVD processing where soot deposition and consolidation along with any doping is performed under one gas-mixture flow, the consolidation step 302 occurs without the fluorine precursor gas being diluted by and in competition with other gasses in a reaction stream such as the oxygen and metal-halide required for the deposition step 300 but whose flow is shut off prior to the consolidation step 302. The consolidation step 302 occurring in only the fluorine precursor gas improves efficiency of fluorine doping and thereby increases amount of fluorine incorporated into the cladding layer relative to fluorine doping introduced as part of the gas mixture in the single step MCVD. Further, intermediary thermal and/or atmospheric conditioning between the soot deposition step 300 and the consolidation step 302 enables adjusting atmospheric oxidation/reduction reaction conditions during consolidation to reduce or eliminate certain glass defects.

At core deposition step 304, conventional MCVD processes or MCVD techniques as described herein deposit an inner layer of pure silica on the glass formed in the consolidation step 302. For some embodiments, the inner layer may include chlorine (Cl) doping to raise the refractive index of the core and improve resistance to attenuation in hydrogen and radiation environments. Chlorine doping of the core may utilize corresponding deposition and consolidation steps as used with the cladding to enhance incorporation of the chlorine.

Collapsing step 306 involves, once deposition of the cladding and core is complete, collapsing the substrate tube to provide a preform with a consolidated structure. Drawing the preform in final fabrication step 308 produces a fiber drawn to have a diameter such as set forth herein. The final fabrication step 308 may include coating the fiber with a plastic having a diameter of about 128 microns to about 132 microns.

The Example 1 preform was prepared by the method depicted in FIG. 3 according to process settings for gas flows and temperatures as set forth in Table 1 below to produce the cladding layer. The substrate in which the cladding layer was deposited was a pure silica tube. After producing the cladding layer, the core of pure silica was deposited in a single step conventional MCVD deposition.

TABLE 1

| | Soot Deposition Step (300) | Consolidation Step (302) |
|---|---|---|
| $SiCl_4$ flow (sccm) | 400 | — |
| $SiF_4$ flow (sccm) | — | 500 |
| $O_2$ flow (sccm) | 600 | — |
| He flow (sccm) | 250 | — |
| Temperature (° C.) | 1590 | 1900 |

Figure 4:
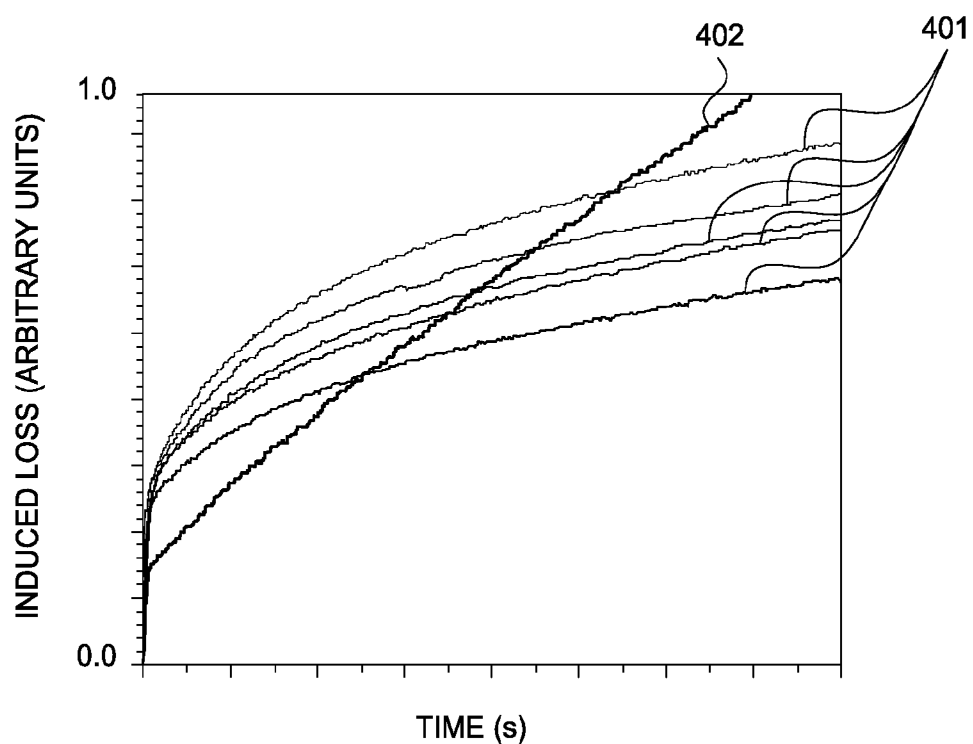
FIG. 4 is a graph of radiation-induced attenuation in five exemplary optical fibers made in accordance with embodiments of the invention as compared to a commercially available pure silica core telecommunication fiber.

FIG. 4 illustrates a graph of radiation-induced attenuation in five exemplary optical fibers made with core and cladding compositions in accordance with embodiments of the invention as compared to a commercially available pure silica core telecommunication fiber. Curves 401 representing these five fibers show growth in induced attenuation from gamma exposure (a.u. $CO_{60}$) similar if not better in response when irradiated than the pure silica core telecommunication fiber represented by reference line 402. Conventional germanium doped sensor and telecommunication fibers exhibit radiation induced attenuation orders of magnitude greater under similar irradiation, and exhibit permanent and transient hydrogen induced attenuation as a function of hydrogen partial pressure and temperature.

Figure 5:
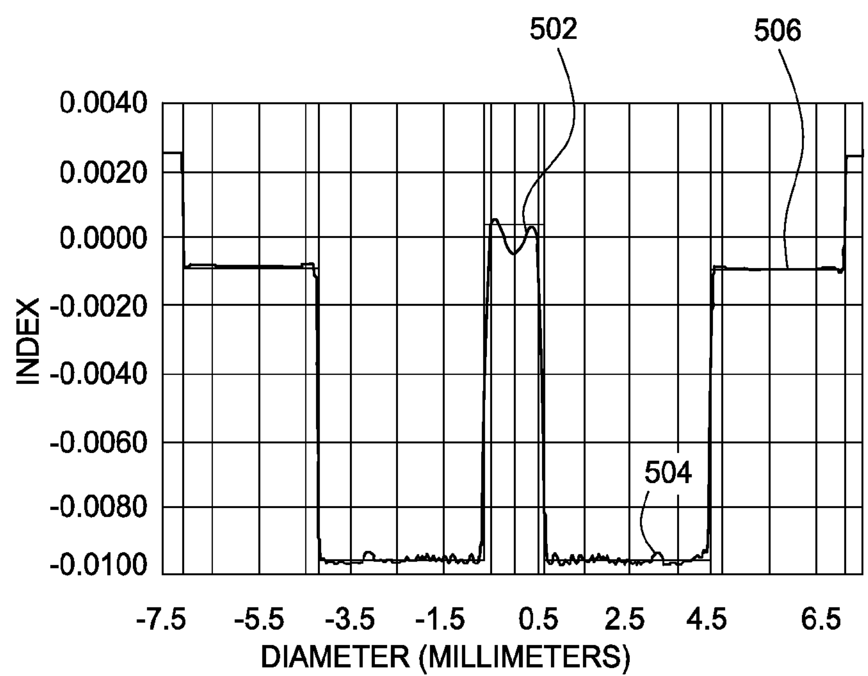
FIG. 5 is a refractive index profile across another optical fiber preform in accordance with embodiments of the invention.

FIG. 5 shows a refractive index profile across another optical fiber preform (Example 2). The Example 2 preform was prepared by the method depicted in FIG. 3 according to process settings for gas flows and temperatures as set forth in Table 1 above and Table 2 below to produce the cladding and core, respectively. The substrate in which the cladding layer was deposited was commercially available fluorinated substrate tubing having material properties of 0.2 parts per million hydroxide (OH), less than 50 ppm chlorine, and about 3500 ppm fluorine.

TABLE 2

| | Core Soot Deposition Step | Core Consolidation Step |
|---|---|---|
| $SiCl_4$ flow (sccm) | 400 | 500 |
| $O_2$ flow (sccm) | 600 | — |
| He flow (sccm) | 250 | — |
| Temperature (° C.) | 1590 | 1900 |

Raising the refractive index of the core improves intrinsic attenuation and bend performance. Referring to the refractive index profile shown in FIG. 2 for the preform of Example 1, fluorine in the cladding layer 104 diffusing into the core 102 during the thermal collapse stage in preform processing causes the central peak 202 to be slightly depressed and less than that of the edge plateau 206 associated with the outer substrate layer 106. With the core 102 slightly depressed relative to the outer substrate layer 106, the fiber tends to be more prone to tunneling waveguide losses under micro- and macro-bending. In some embodiments, chlorine doping of the silica core can bring the index to match that of the outer silica layer, and furthermore, use of fluorinated substrate tubing can yield an improved waveguide design illustrated by the Example 2. As shown in FIG. 5, the chlorine doped core refractive index 502 being raised above that of the outer layer refractive index 506 leads to improved attenuation and bend loss since any light leaked out of the core tends to be reflected back into the core rather than being grabbed by the substrate layer. Further, the cladding layer refractive index 504 remains depressed relative to the core and also the substrate layer that has less fluorine doping than the cladding layer.

Various aspects of the preforms or fibers described herein modify one or more of the core, the cladding layer or the substrate layer to achieve desired sensor suitable optical fibers. The examples illustrate some combinations of these modifications which may be interchanged or omitted, for some embodiments, to create additional configurations of cores, claddings and substrates such as described herein. In some embodiments, fibers may contain additional layers other than the core, cladding and substrate, such as two distinct cladding layers between the core and the substrate. In addition, some embodiments utilize outside vapor deposition (OVD) processes analogous to the MCVD technique to achieve fibers with similar results. While the foregoing is directed to embodiments of the present invention, other and further embodiments of the invention may be devised without departing from the basic scope thereof, and the scope thereof is determined by the claims that follow.

What is claimed is:

1. An optical waveguide, comprising:

a core formed of one of silica without dopants and silica doped with chlorine;

a cladding surrounding the core and formed of silica doped with fluorine such that one or more of fluorine and chlorine are the only dopants present in the core and the cladding, wherein the cladding comprises at least two distinct cladding layers and wherein at least one of the cladding layers has a first refractive index at least 0.008 relatively lower than a second refractive index of the core; and an outer layer surrounding the cladding, wherein the outer layer has an outer diameter less than 100 microns.

2. The optical waveguide of claim 1, wherein the outer layer comprises a silica layer surrounding the cladding and defining outermost glass of the waveguide.

3. The optical waveguide of claim 2, wherein the silica layer has an outer diameter of 78 to 82 microns.

4. The optical waveguide of claim 2, wherein the silica layer comprises fluorine dopants at a concentration less than that of the cladding.

5. The optical waveguide of claim 2, wherein the silica layer comprises fluorine dopants and has a third refractive index between the first and second refractive indices.

6. The optical waveguide of claim 4, wherein the core is formed of silica that is doped only with chlorine.

7. The optical waveguide of claim 1, wherein the core and the cladding define a mode field diameter of about 7.8 microns.

8. The optical waveguide of claim 1, wherein the core is formed of silica doped only with chlorine.

9. The optical waveguide of claim 1, wherein the first refractive index of the at least one of the cladding layers is at least 0.009 relatively lower than the second refractive index of the core.

10. An optical waveguide, comprising:

a core formed by glass made of one of pure silica and silica doped only with chlorine;

a first inner cladding layer surrounding the core and formed by glass made of silica doped only with fluorine;

a second inner cladding layer surrounding the first inner cladding layer, wherein at least one of the first or second inner cladding layer has a first refractive index at least 0.008 lower relative to a second refractive index of the core; and an outer cladding layer surrounding the second inner cladding layer and formed by glass made of one of pure silica and silica doped only with fluorine, wherein dimensions of the core and the cladding layers define a mode field diameter for single mode propagation through the waveguide that has an outermost glass diameter of 78 to 82 microns.

11. The optical waveguide of claim 10, wherein the core and the cladding define the mode field diameter of about 7.8 microns.

12. The optical waveguide of claim 10, wherein a concentration of fluorine doped into the cladding layers enables obtaining a numerical aperture that confines the single mode propagation through the optical waveguide to resist bend-induced attenuation.

13. The optical waveguide of claim 10, wherein the outermost glass diameter of 78 to 82 microns enables bending of the optical waveguide around smaller diameters than those achieved by optical fibers having an outer diameter of 125 microns.

14. The optical waveguide of claim 1, wherein a concentration of fluorine doped into the cladding enables obtaining a numerical aperture that confines a mono-mode of the optical waveguide to resist bend-induced attenuation.

15. The optical waveguide of claim 1, wherein the outer diameter of the outer layer is in a range from 78 to 82 microns.

16. The optical waveguide of claim 1, wherein the outer diameter of less than 100 microns enables bending of the optical waveguide around smaller diameters than those achieved by optical fibers having an outer diameter of 125 microns.

* * * * *